May 5, 1936. A. RUZICKA 2,039,608

LAND AND WATER VEHICLE

Filed Sept. 13, 1935 2 Sheets-Sheet 1

Inventor
Anton Ruzicka
Bryant Lowry
Attorneys

May 5, 1936.  A. RUZICKA  2,039,608
LAND AND WATER VEHICLE
Filed Sept. 13, 1935  2 Sheets-Sheet 2
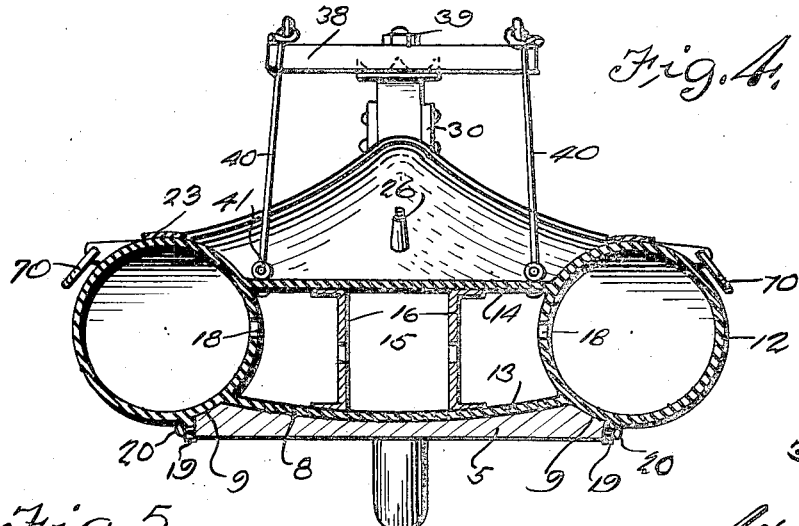
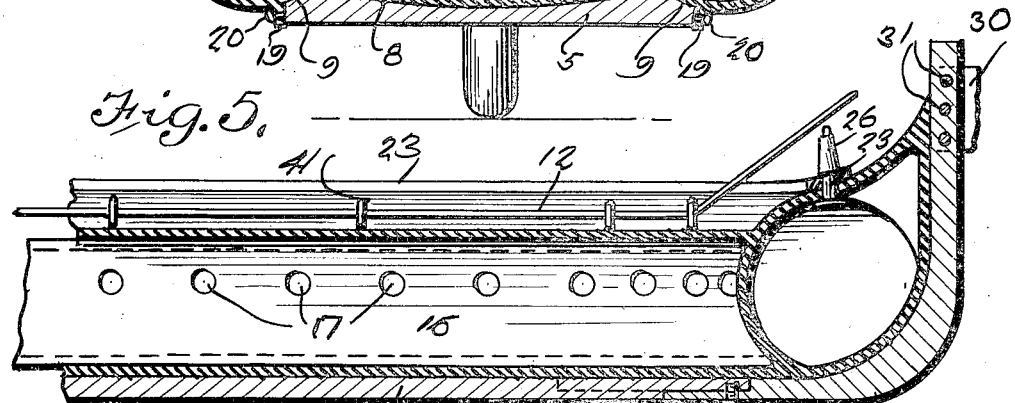
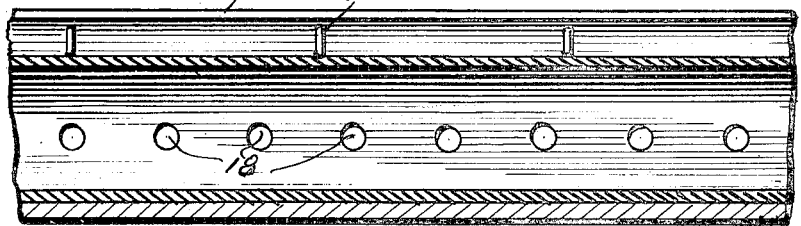
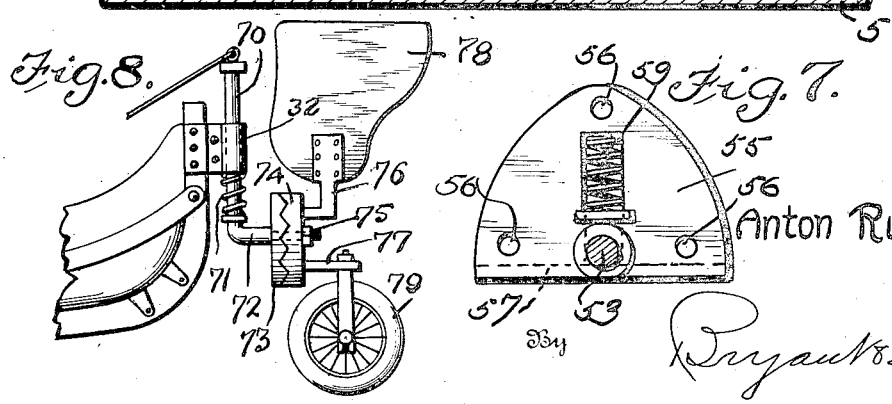
Inventor
Anton Ruzicka.
By Bryant & Lorenz
Attorneys Patented May 5, 1936

2,039,608

UNITED STATES PATENT OFFICE 2,039,608

LAND AND WATER VEHICLE

Anton Ruzicka, Chicago, Ill.

Application September 13, 1935, Serial No. 40,489

11 Claims. (Cl. 9—1)

This invention relates to improvements in land and water vehicles having a sail as a means of propulsion.

The primary object of this invention is to provide a vehicle of the above mentioned character having a U-shaped inflatable bag for increasing the buoyancy of the device when used in the water.

A further object of this invention is to provide a vehicle of the above mentioned character having resilient connections between the wheels and hull in order to add to the comfort of the occupant when the device is being used on land.

A further object of this invention is to provide a vehicle of the above mentioned character having an interchangeable rear steering wheel which may be used on land and a rudder when employed in the water.

A further object of this invention is to provide a unique hull structure which may be partially collapsed.

A still further object of this invention is to provide a vehicle of the character described having a sail which may be employed for propelling the vehicle forward on either land or in the water.

A still further object of this invention is to provide a bow-shaped nose for the vehicle to which the rubber inflatable bag may be secured to complete the hull structure.

Other objects and advantages of the invention will become apparent during the course of the following description, forming a part of this specification and taken with the drawings, wherein, Figure 1 is a side elevation of the vehicle embodying this invention;

Figure 4 is a vertical transverse cross-sectional view taken on line 4—4 of Figure 1, looking in the direction of the arrows illustrating the steering gear;

Figure 5 is a longitudinal cross-sectional view taken on line 5—5 of Figure 2, looking in the direction of the arrows, illustrating one of the metal partitions formed in the inflatable bag;

Figure 6 is a fragmentary longitudinal cross-sectional view taken on line 6—6 of Figure 2, looking in the direction of the arrows and illustrating the interior of one of the sections of the inflatable bag;

Figure 7 is a front elevation of one of the resilient suspension devices for accommodating the axles of the front wheels; and Figure 8 is a side elevational view of the stern portion of the vehicle, illustrating a reversible rudder and steering wheel.

Figure 1:
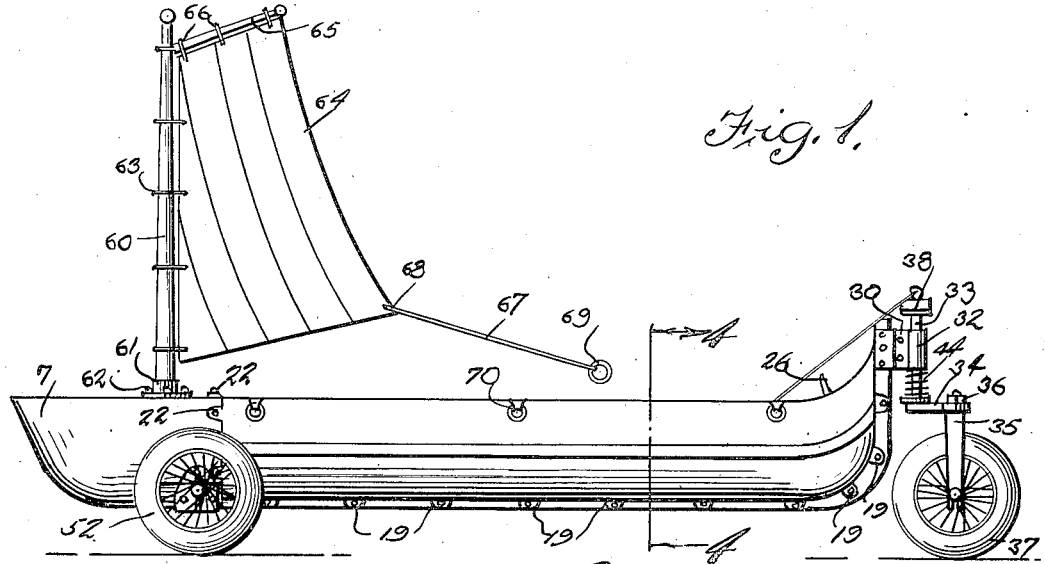

In the drawings, wherein for the purpose of illustrating the invention and wherein like reference characters will be employed to designate like parts throughout the same, the reference character 5 will generally be employed to designate a base plate having a pointed forward end 6 and provided with a built-up section 7 to represent the bow of a boat. The upper surface of the base plate 5 is curved as at 8 and the longitudinal edges are bevelled as indicated by the reference character 9 in Figure 4.

The bow portion 7 of the vehicle is provided with a deck section 11 having a hinged door 12 whereby access may be gained to the interior of the hull section 7 for the purpose of storing supplies or sections of the boat when the same is collapsed.

Figure 2:
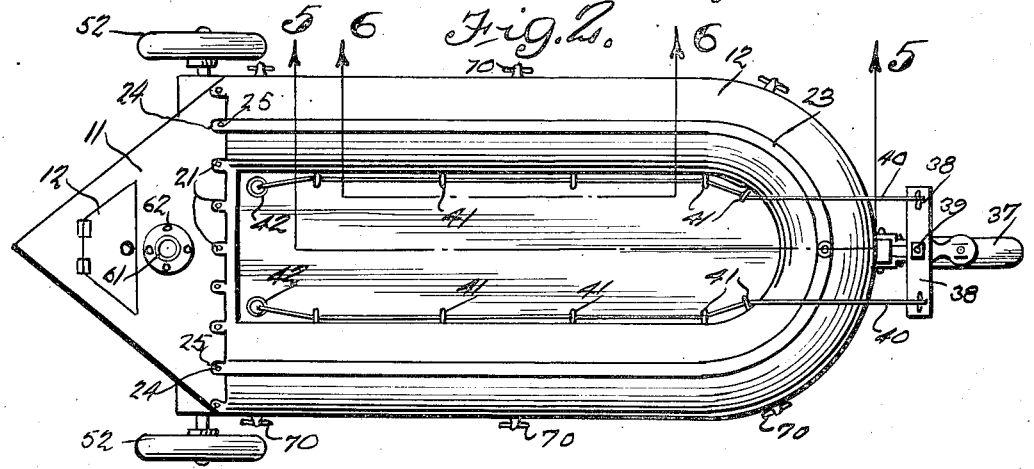
Figure 2 is a top elevation illustrating the formation of the inflatable container forming a portion of the hull.
Figure 3:
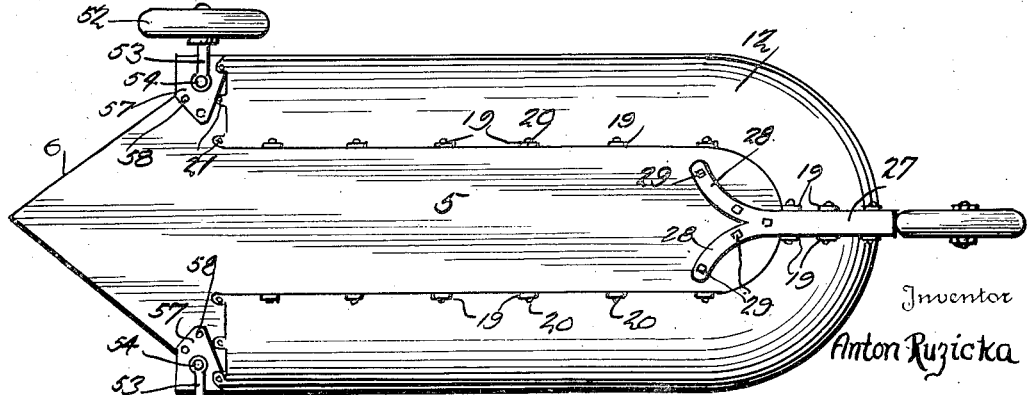
Figure 3 is a bottom elevation illustrating the manner in which the U-shaped rubber bag is attached to the frame structure.

Secured to the base plate 5 as shown in Figures 2 and 3 is the U-shaped inflatable bag 12 closed at the free ends of the side legs and connected along its entire length by web portions 13 and 14 forming a compartment 15. Said compartment being strengthened or reinforced by longitudinal beams 16 having spaced perforations 17 for allowing the passage of air through the compartment 15 to the legs of the rubber bag 12 which is also provided with apertures 18 communicating with the chamber 15.

Rubber straps 19 are formed integral with the rubber bag 12 along the underside thereof for being secured to the base plate 5 by means of bolts or screws 20, while the free ends of the legs of the U-shaped bag may be connected to the hull section 7 by similarly shaped straps 21 secured in place by means of screws 22.

For the purpose of further reinforcing the rubber bag 12 there is further provided a U-shaped band 23 preferably formed of metal secured to the upper portion of the inflatable bag and having the free ends as at 24 secured to the hull section 7 by means of screws 25.

An inflating valve 26 may be secured to the inflatable bag 12 at the curved portion and a nut may be secured upon the inflating valve 26 for the purpose of retaining the curved portions of the reinforcing band 23 in place.

Secured to the rear portion of the base member 5 is a heel 27 formed of a rigid material having strap portions 28 secured in place by means of wooden screws 29. The heel portion 27 extends upwardly and partially embraces the inflatable rubber bag 12 and said heel portion 27 is provided with a bracket 30 secured to the upper end of the heel portion by means of screws 31 in order to form a loop portion 32 capable of forming a bearing for a shaft or spindle 33, the lower end of which is offset as at 34 to which is secured a fork 35 by means of a nut 36.

When the vehicle is being used upon land, a wheel 37 may be interposed between the fork 35 for the purpose of steering the vehicle which is accomplished by means of a cross bar 38 secured to the upper end of the spindle 33 by means of the bolt and nut 39. Steering cords 40 may be secured to the cross bar 38 and are guided through eyelets 41 to the forward portion of the structure where they are provided with handles 42 in the form of rings.

It will be noted that a coil spring 44 is disposed between the offset bracket 34 and the spindle bearing 32 for the purpose of absorbing road shocks and causing the vehicle to ride more comfortably.

In the form of invention illustrated in Figure 8, there is shown a steering device for the boat that may be used on land or water, the same being reversibly mounted. A shaft 70 is journalled in the loop portion 32, being spring pressed as at 71 and having a lower angle end 72 carrying a clutch disk 73. A cooperating clutch disk 74 is associated with the clutch disk 73 and the two disks are retained in engagement with each other by the nut 75 threaded upon the projecting end of the lower portion 72 of the shaft 70. Angle irons 76 and 77 project from the outer side of the clutch disk 74 and respectively carry a rudder 78 and a ground steering wheel 79. It will be understood that by reversing the clutch disk 74, the ground wheel 79 is raised and the rudder 78 lowered for use when the boat is placed on water.

The forward portion of the hull structure 7 is supported by rubber tired wheels 52 mounted on axles 53 which are resiliently connected to the hull portion by means of vertical spindles 54 slidably mounted in angle plates 55 which may be secured to the bow portion of the boat by passing fastening elements through the openings 56. The angle plate 55 is provided with a base portion 57 which may be secured to the under surface of the hull portion 7 by fastening elements such as screws 58. Each of the axles 53 is engaged by a coil spring 59 which may compress under road shock and allow the swinging movement of the axle in a vertical direction. One of the angle plates is clearly shown in Figure 7 of the drawings wherein is illustrated also one of the coil springs bearing against one of the axles 53.

Secured to the deck portion of the hull 7 is a mast 60 held in place by means of a flanged collar 61 through which is passed screws 62 anchored in the deck 11. The upper portion of the mast 60 is adapted to support a sail 64 by means of ringlets 63 slidably mounted upon the mast and swingingly carried by the upper end of the mast is a boom 65 to which is attached the upper end of the sail 64 by means of rings 66. A tacking 67 is secured to the sail 64 as at 68 and a handle 69 is provided for the occupant to use in controlling the sail during tacking.

It is to be understood that the forms of the invention herewith shown and described are to be taken as the preferred embodiments of the same and that various changes in the shape, size and arrangement of parts may be resorted to without departing from the spirit and scope of the invention as claimed.

I claim:—

1. A hull structure comprising a base plate having a bow portion, an inflatable rubber U-shaped bag having the ends of the legs secured to the bow-portion, the legs of the bag being disposed at opposite sides of the base plate and the closed end located at the rear end thereof, means for reinforcing the U-shaped bag and straps carried by the rubber bag for attachment to the base plate.

2. A hull structure including a wheeled frame, a bow-shaped housing formed on the front of the wheeled frame, an inflatable rubber U-shaped bag mounted on the wheeled frame with the legs of the bag located at the sides of the frame and the ends of the bag terminating adjacent the bow, the closed end of the bag being located at the rear end of the frame, straps carried by the rubber bag for securing the rubber bag to the wheeled frame, and means for propelling the wheeled frame.

3. A vehicle comprising a wheeled frame, a hull section carried by the forward portion of the frame, an inflatable U-shaped rubber bag mounted on the wheeled frame with the legs of the bag located at the sides of the frame and the ends of the bag terminating adjacent the bow, the closed end of the bag being located at the rear end of the frame, and having its free ends secured to the hull section, means for steering the wheeled frame, and means for propelling the vehicle when on land and in the water.

4. A land and water vehicle comprising a wheeled frame, a hull section secured to the forward portion of the frame shaped in the fashion of a boat bow, an inflatable U-shaped rubber bag mounted on the wheeled frame with the legs of the bag located at the sides of the frame and the ends of the bag terminating adjacent the bow, the closed end of the bag being located at the rear end of the frame, and having its free ends secured to the hull section, a sail carried by the hull section and interchangeable means for steering the vehicle on land and in the water.

5. A land and water vehicle comprising a wheeled frame, a hull section representing the bow of a boat secured to the forward portion of the wheeled frame, a rubber U-shaped inflatable bag mounted on the wheeled frame with the legs of the bag located at the sides of the frame and the ends of the bag terminating adjacent the bow, the closed end of the bag being located at the rear end of the frame, lugs carried by the bag for attachment to the frame, lugs carried by the free ends of the U-shaped bag for attachment to the hull section and webs connecting the U-shaped rubber bag forming a central inflatable compartment.

6. A land and water vehicle comprising a wheeled frame, a hull section representing the bow portion of a boat secured to the forward portion of the wheeled frame, a U-shaped inflatable rubber bag mounted on the wheeled frame with the legs of the bag located at the sides of the frame and the ends of the bag terminating adjacent the bow, the closed end of the bag being located at the rear end of the frame, and having its ends connected to the hull section, means for fastening the rubber bag to the wheeled frame and hull section, a pair of webs connecting the U-shaped bag forming a central compartment, reinforcing bars mounted in the central compartment, a sail for propelling the vehicle and means for steering the vehicle when on land and in the water.

7. A land and water vehicle comprising a wheeled frame, a hull section representing the bow portion of a boat secured to the forward end of the wheeled frame, an inflatable U-shaped rubber bag mounted on the wheeled frame with the legs of the bag located at the sides of the frame and the ends of the bag terminating adjacent the bow, the closed end of the bag being located at the rear end of the frame, and having its ends connected to the hull section, upper and lower webs connecting the legs of the inflatable bag forming a central compartment and a reinforcing bar extending longitudinally within the chamber, and lugs connecting the U-shaped bag to the wheeled frame.

8. A land and water vehicle comprising a base plate, an inflatable rubber bag of U-shape mounted on the base plate, means for securing the legs of the bag to opposite sides of the base plate, and webs connecting the legs above the base plate and forming an air chamber communicating with the U-shaped bag.

9. A land and water vehicle comprising a base plate, an inflatable rubber bag of U-shape mounted on the base plate, means for securing the legs of the bag to opposite sides of the base plate, webs connecting the legs above the base plate and forming an air chamber communicating with the U-shaped bag, and reinforcing elements in the chamber for holding the webs in spaced relation.

10. A hull structure comprising a base plate having a bow portion, an inflatable rubber U-shaped bag having the ends of the legs secured to the bow-portion, the legs of the bag being disposed at opposite sides of the base plate and the closed end located at the rear end thereof, means for reinforcing the U-shaped bag and straps carried by the rubber bag for attachment to the base plate, and interchangeable means for steering the vehicle on land or water including a steering wheel and a rudder, a vertically journalled shaft carrying the wheel and rudder and a hinged joint in the shaft constructed and arranged whereby either the wheel or rudder may be disposed in service position.

11. A land and water vehicle comprising a base plate, an inflatable rubber bag of U-shape mounted on the base plate, means for securing the legs of the bag to opposite sides of the base plate, webs connecting the legs above the base plate and forming an air chamber communicating with the U-shaped bag, and interchangeable means for steering the vehicle on land or water including a steering wheel and a rudder, a vertically journalled shaft carrying the wheel and rudder and a hinge joint in the shaft constructed and arranged whereby either the wheel or rudder may be disposed in service position.

ANTON RUZICKA.